United States Patent [19]

Larson

[11] Patent Number: 4,869,205

[45] Date of Patent: Sep. 26, 1989

[54] MILKING MACHINE INFLATION

[75] Inventor: Leigh R. Larson, Johnson Creek, Wis.

[73] Assignee: Hi-Life Rubber Inc., Johnson Creek, Wis.

[21] Appl. No.: 202,712

[22] Filed: Jun. 3, 1988

[51] Int. Cl.⁴ .............................................. A01J 5/04
[52] U.S. Cl. ................................................ 119/14.51
[58] Field of Search ............... 119/14.47, 14.50, 14.49, 119/14.51

[56] References Cited

U.S. PATENT DOCUMENTS

| | | | |
|---|---|---|---|
| 2,099,884 | 11/1937 | Green | 119/14.51 |
| 2,341,953 | 2/1944 | Scott | 119/14.51 |
| 2,694,379 | 11/1954 | Hein | 119/14.47 |
| 3,611,993 | 10/1971 | Norton | 119/14.36 |
| 4,196,696 | 4/1980 | Olander | 119/14.51 |
| 4,324,201 | 4/1982 | Larson | 119/14.51 |
| 4,459,939 | 7/1984 | Noorlander | 119/14.49 |
| 4,651,676 | 3/1987 | Kupres | 119/14.49 |
| 4,745,881 | 5/1988 | Larson | 119/14.51 |

FOREIGN PATENT DOCUMENTS

| | | | |
|---|---|---|---|
| 50075 | 3/1935 | Denmark | 119/14.49 |
| 90418 | 2/1961 | Denmark | 119/14.48 |
| 1068472 | 6/1954 | Sweden | 119/14.51 |
| 2053648 | 2/1981 | United Kingdom | 119/14.51 |

Primary Examiner—Paul J. Hirsch
Attorney, Agent, or Firm—Michael, Best & Friedrich

[57] ABSTRACT

The claw end portion of the milking machine inflation adapted to be slipped onto a nipple of milking machine claw includes an enlarged reinforcement section in the region near the outer end of the claw nipple. The reinforcement section has a thickened lower wall portion covering the bottom portion of the claw nipple and extending circumferentially around at least 50% of the outer circumference of the reinforcement section and an upper wall portion having a thickness substantially less than the thickness of the lower wall portion and including a plurality of axially spaced, circumferentially extending ribs on the outer surface thereof.

6 Claims, 1 Drawing Sheet

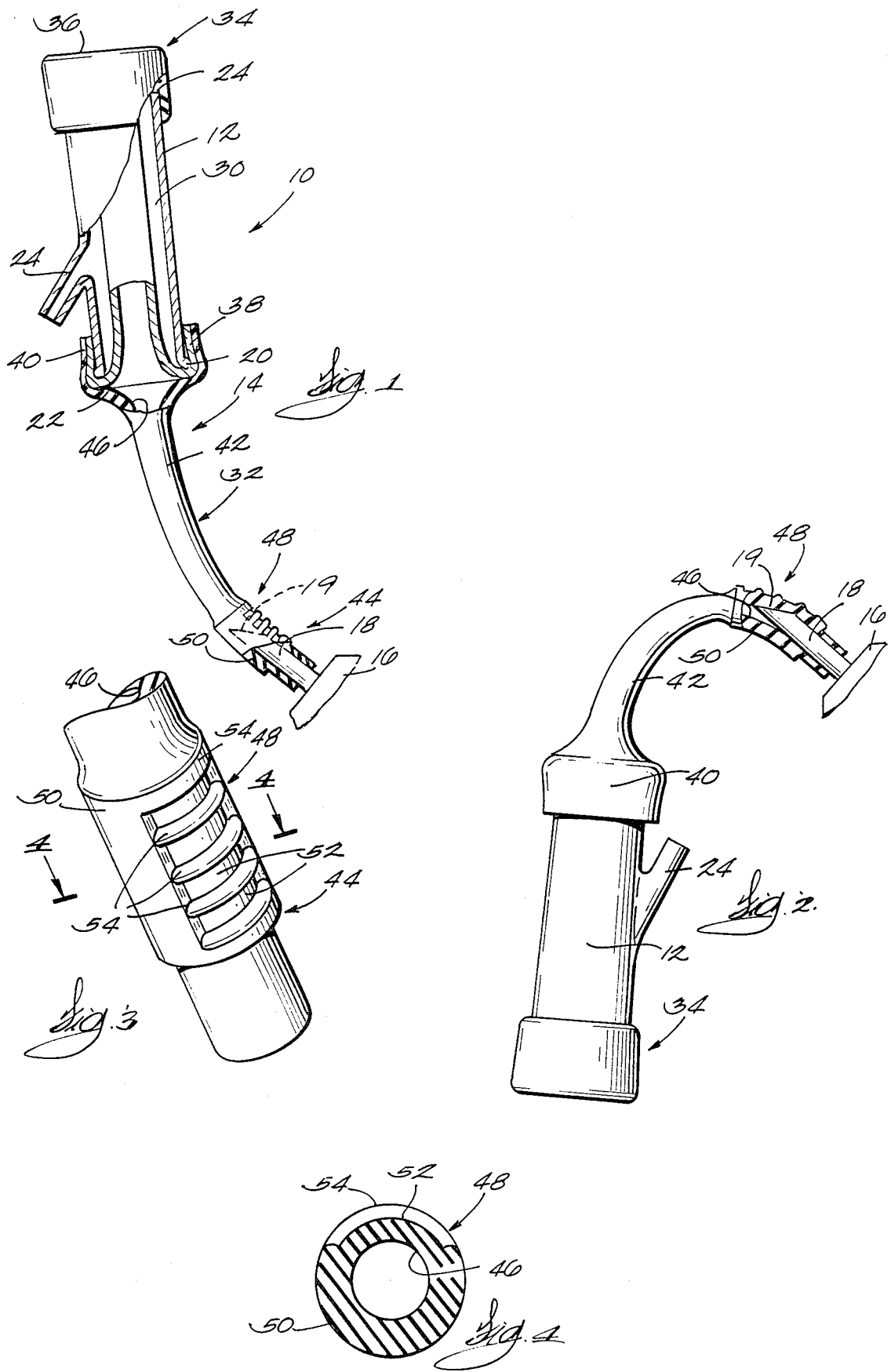

MILKING MACHINE INFLATION

BACKGROUND OF THE INVENTION

This invention relates to inflations for teat cup assemblies of vacuum-operated milking machines and, more particularly, to such inflations including a milking tube section which is attached to a nipple on a milker claw.

Vacuum-operated milking machines typically include a milker claw having four ferrules or nipples. A teat cup assembly including a flexible (e.g., rubber) liner or inflation is attached to each milker claw nipple. During the milking operation, the teat cup assemblies are suspended from a cow's teats and milk flows through the inflation under the influence of a vacuum maintained in the claw. After a teat cup assembly is removed from a teat upon completion of milking, the inflation is suspended from the claw nipple in a manner to shut off communication between the claw and the atmosphere and thereby preserve the vacuum in the system.

When the claw is pulled away from a cow, either manually or automatically, the claw end portion of the inflation, can be bumped against surrounding equipment, objects, etc. and often strike the ground quite hard, particularly at dairies with automatic take-offs. Also, cows frequently step on inflations in the region of the claw nipples. This can result in the portion of the inflation beneath the claw nipple being damaged.

One approach for minimizing this problem is to provide the claw end portion of the inflation with an enlarged reinforcement section in the region near the outer end of the claw nipple. However, as the reinforcement section is thickened to improve its impact protection, the resulting stiffness reduces the vacuum shut-off capability and also makes it more difficult to connect the teat cup assembly to a teat. This stiffness also transmits a significant sideways force to the teat, which can cause undesired atmospheric air to be admitted and contribute to liner slippage.

Representative prior inflation constructions designed to facilitate vacuum shut-off and/or minimize inflation damage from bumping are disclosed in the following U.S. patents:

| Patentee | U.S. Pat. No. | Issue Date |
| --- | --- | --- |
| Green | 2,099,884 | November 23, 1937 |
| Scott | 2,341,953 | February 15, 1944 |
| Hein | 2,694,379 | November 16, 1954 |
| Norton | 3,611,993 | October 12, 1971 |
| Olander | 4,196,696 | April 8, 1980 |
| Larson | 4,324,201 | April 13, 1982 |

None of these patents discloses an inflation including a reinforcement section which is specifically designed to minimize damage from bumping or crushing from beneath the claw nipple and yet permit good vacuum shut-off and facilitate bending for connection to a teat without imparting excessive sideways forces on the teat.

SUMMARY OF THE INVENTION

One of the principal objects of the invention is to provide a milking machine inflation including means for providing improved protection to the claw end portion against damage from impacts in the region of the milker claw nipple and yet have sufficient flexibility to permit good vacuum shut-off and permit upward bending for attachment to a teat without imparting excessive sideways forces to the teat.

Another of the principal objects of the invention is to provide such a milking inflation which can be conveniently formed by conventional molding techniques.

Other objects, aspects and advantages of the invention will become apparent to those skilled in the art upon reviewing the following detailed description, the drawing and the appended claims.

The milking machine inflation of the invention is made from a flexible or elastomeric material and includes a milking tube section extending from the lower end of a teat cup assembly shell and having a claw end portion adapted to be slipped onto a nipple of a milking machine claw. The claw end portion has an enlarged reinforcement section in the region near the outer end of the claw nipple. The reinforcement section includes a thickened lower wall portion covering the bottom portion of the claw nipple and extending circumferentially around at least 50% of the outer circumference of the reinforcement section and an upper wall portion having a thickness substantially less than the thickness of the lower wall portion and including a plurality of axially spaced, circumferentially extending ribs on the outer surface thereof. This arrangement provides protection against impacts from beneath the claw nipple, has sufficient flexibility for good vacuum shut-off and minimizes sideways forces imparted to the teat. The ribs prevent the inward collapse of the upper portion of the reinforced section when it is stretched over the beveled portion of the claw nipple.

The lower wall portion preferably is solid and preferably extends around up to about 65% of the outer circumference of the reinforcement section.

BRIEF DESCRIPTION OF THE DRAWING

FIG. 1 is a fragmentary, partially sectioned, side elevation view of a teat cup assembly carrying an inflation embodying the invention, shown with the inflation connected to a milker claw nipple and with the teat cup assembly in position for attachment to a teat.

FIG. 2 is a view similar to FIG. 1 with a teat cup assembly removed from a teat and dropped to a vacuum shut-off position.

FIG. 3 is an enlarged, fragmentary view of the claw end portion of the inflation.

FIG. 4 is a sectional view taken generally along line 4—4 in FIG. 3.

DESCRIPTION OF THE PREFERRED EMBODIMENTS

Illustrated in FIG. 1 is a teat cup assembly 10 including a rigid, generally cylindrical outer shell 12 which supports a multiple-piece, milking inflation 14 connected to a milking machine claw 16 (shown fragmentarily). The claw 16 is connected to a suitable vacuum system (not shown) in the usual manner and includes a plurality of upwardly projecting ferrules or nipples 18 (one shown) having a beveled outer end 19.

The shell 12 is formed from a metal, such as stainless steel, or another suitable rigid material, such as a synthetic thermoplastic or thermosetting resin. The shell has a lower end 20 including an opening 22 and an upper end terminating in a rim 24.

Located in the side of the shell 12 is a nipple 24 connected, via suitable tubing (not shown), in communication with a pulsator which alternately opens to atmospheric pressure and evacuates the chamber between the interior wall of the shell 12 and the inflation to alternately contract and expand the inflation for milking.

The inflation 14 has a separate shell section 30 and a milking tube section 32, both of which are molded from a resilient or an elastomeric material, preferably a synthetic or natural rubber composition. The shell section 30 includes a suction sleeve 33 which fits inside the shell 12 and a head section 34 which fits over the shell rim 24 and has a mouthpiece 36 including a circular opening (not shown) for receiving a cow's teat. The shell section 30 also has a lower end portion 38 which extends through the opening 22 in the shell lower end 20 and is folded back over the outer surface of the shell lower end 22.

The milking tube section 32 includes an enlarged, cup-shaped upper end portion 40 which fits over and sealingly engages the lower portion 38 of the shell section 30 and an elongated stem portion 42 having a claw end portion 44 which is adapted to be slipped onto a claw nipple 18.

As used herein, the term "inflation" means the total assembly supported by the shell 12 and exposed to milk, for example, both the shell section 30 and the milking tube section 32 in the specific construction illustrated.

When the teat cup assembly 10 is in the position illustrated in FIG. 1 with the mouthpiece 36 of the inflation 14 slipped over a cow's teat, milk flows through the shell section 30, the milking tube section 32, the claw nipple 18 and into the claw 16. After the teat cup assembly 10 has been removed from a cow's teat and drops to the position shown in FIG. 2, the inner wall 46 of the claw end portion 44 sealingly engages the beveled outer end 19 of the claw nipple 18 to shut off communication between the claw 16 and the atmosphere, thereby preserving the vacuum in the system.

The inner wall 46 of the milking tube section 32 preferably is smooth or at least substantially crevice-free to facilitate cleaning between milking operations.

The milking tube section 32, including the claw end portion 44, has a substantially constant inside diameter and the claw end portion 44 includes an enlarged reinforcement section 48 in the region near the outer end 19 of the claw nipple 18. The reinforcement section 48 is arranged to maximize impact protection in the region of the claw nipple 18, permit good vacuum shut-off without collapsing the interior at the bevel of the claw nipple 18 and facilitate attachment of the teat cup assembly 10 to a teat without imparting excessive sideways forces to the teat.

This is accomplished by providing the reinforcement section 48 with a thickened lower wall portion 50 which covers the bottom portion of the claw nipple 18 and a thinner upper wall portion 52 having a thickness which is substantially less than the thickness of the lower wall portion 50 and includes a plurality of axially spaced, circumferentially extending ribs 54 on the outer surface thereof to prevent inward collapsing.

The lower wall portion 50 serves as a cushion against impacts in the region beneath the claw nipple 18 and thereby protects against crushing, cuts, etc. which can reduce the service life of the inflation 14. The thickness of the lower wall portion 50 is somewhat greater than the wall thickness of the remainder of the stem portion 42. Generally, its thickness is about 20 to about 35% greater than the wall thickness of the stem portion 42. As a guide, for a standard milking tube section with a stem portion which is about 5¼ inches long, has an outside diameter of about 25/32 inch and has a wall thickness of about 11/64 inch, the thickness of the lower wall portion 50 can be about 3/16 to about ¼ inch.

While the lower wall portion 50 can have various surface configurations, so long as its minimum thickness is substantially greater than the thickness of the upper wall portion 52, it preferably is solid to facilitate convenient forming by conventional molding techniques. The lower wall portion 50 preferably extends circumferentially around at least 50%, most preferably up to about 65%, of the outer circumference of the reinforcement section 48.

The thinner upper wall portion 52 serves to impart flexibility to the reinforcement section 48 which facilitates sealing engagement of the inner wall 46 with the beveled outer end 19 of the claw nipple 18. It also imparts flexibility which facilitates bending the inflation 14 into the position illustrated in FIG. 1 for attachment to a cow's teat without imparting excessive side loading on the teat. To best serve this function, the wall thickness of the upper wall portion 52 preferably is about 60 to about 75% of the thickness of the lower wall portion 50.

While the ribs 54 provide some protection against impact from above the claw nipple 18, their primary functions are to provide sufficient reinforcement to prevent the portion of the reinforcement section 48 beyond the bevel of the claw nipple 18 from collapsing and kinking on the claw nipple bevel and also to prevent excessive sideways forces from being imparted to the teat when the inflation 14 is bent up for attachment to a teat. Such collapsing can cause an undesirable reduction in the cross sectional area in the flow passage through the milking tube section 32 and the sideways forces can permit leakage of atmospheric air into the inflation which can cause slipping. To best serve this purpose, the ribs 54 preferably are axially spaced at substantially equal intervals and have a height (i.e., distance above the outer surface of the upper wall portion 52) which is about 25 to about 40% of the thickness of the upper wall portion 52.

The number of ribs 54 used is sufficient to prevent the reinforcement section 48 from collapsing or kinking without making the reinforcement section 48 so stiff that it cannot provide good vacuum shut-off. Thus, the number of ribs depends on the inflation material, thickness of the upper wall portion 52, length of the reinforcement section 48 and height and width of the ribs. As a guide, 4 to 6 ribs usually are sufficient. In the specific construction illustrated, the reinforcement section 48 has five ribs.

From the foregoing description, one skilled in the art can easily ascertain the essential characteristics of the invention and, without departing from the spirit and scope thereof, make various changes and modifications to adapt it to various usages. For instance, while the invention has been described in connection with a specific type two-piece inflation, it can be used on single piece inflations and other multiple-piece inflations including a milking tube section which is attached to a claw nipple.

I claim:

1. An inflation for a milking machine teat cup assembly including a rigid shell, said inflation being made from an elastomeric material and comprising
a milking tube section extending from the lower end of the shell and having a claw end portion adapted to be slipped onto a nipple of a milking machine claw, said claw end portion having an enlarged reinforcement section in the region near the outer end of the claw nipple including along the axial length of the reinforcement section a lower thick wall portion longitudinally covering the bottom portion of the claw nipple and extending circumferentially around at least 50% of the outer circumference of said reinforcement section and an upper wall portion having a thickness substantially less than the thickness of said lower wall portion and including a plurality of axially spaced, circumferentially extending ribs on the outer surface thereof.

2. An inflation according to claim 1 wherein said lower wall portion is solid.

3. An inflation according to claim 1 wherein said bottom wall portion extends around up to about 65% of the outer circumference of said reinforcement section.

4. An inflation according to claim 1 wherein said ribs are axially spaced at substantially equal intervals.

5. An inflation according to claim 1 wherein the thickness of said upper wall portion is about 60 to about 75% of the thickness of said bottom wall portion.

6. An inflation according to claim 1 wherein the height of said ribs above the outer surface of said upper wall portion is about 25 to about 40% of the thickness of said upper wall portion.

* * * * *